Dec. 6, 1955   S. E. HUFF   2,725,998
TRUCK WHEEL DOLLIES
Filed Nov. 28, 1951   4 Sheets-Sheet 1
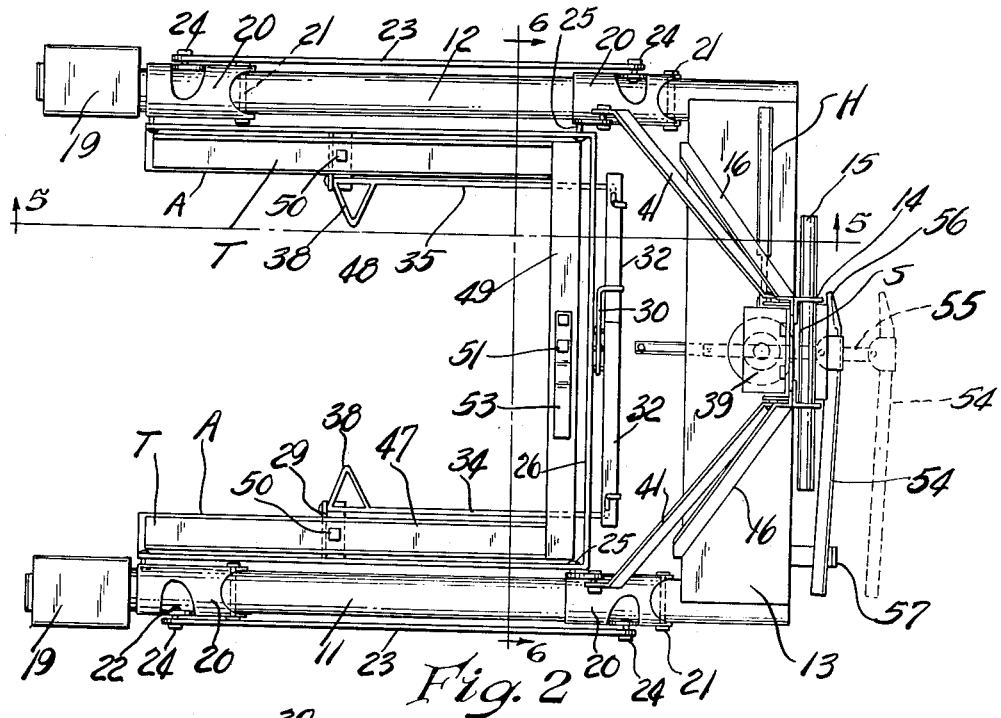
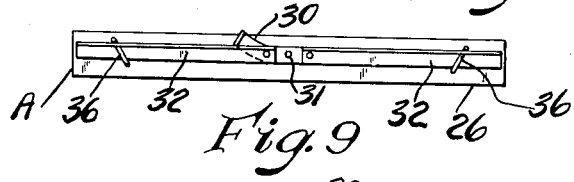
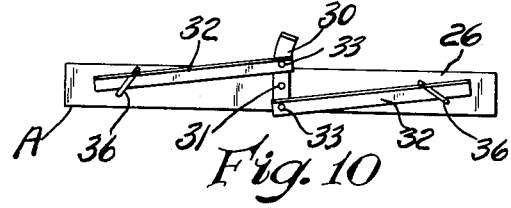
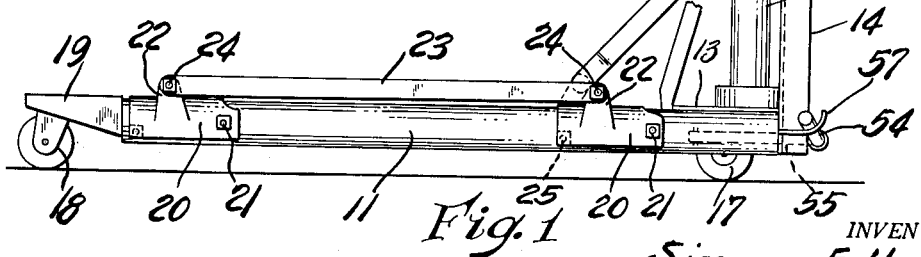
INVENTOR.
Sireno E. Huff.
BY
Frank C. Larman
ATTORNEY Dec. 6, 1955  S. E. HUFF  2,725,998
TRUCK WHEEL DOLLIES
Filed Nov. 28, 1951  4 Sheets-Sheet 2
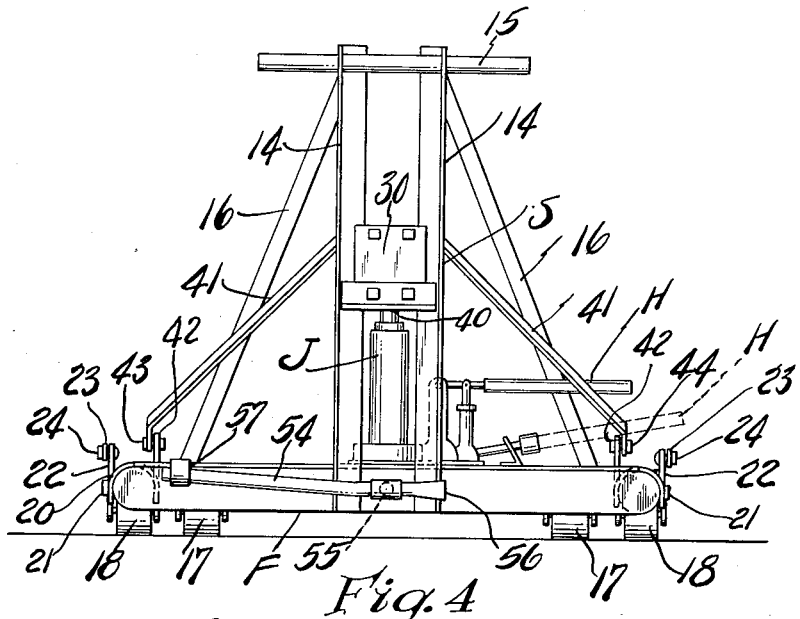
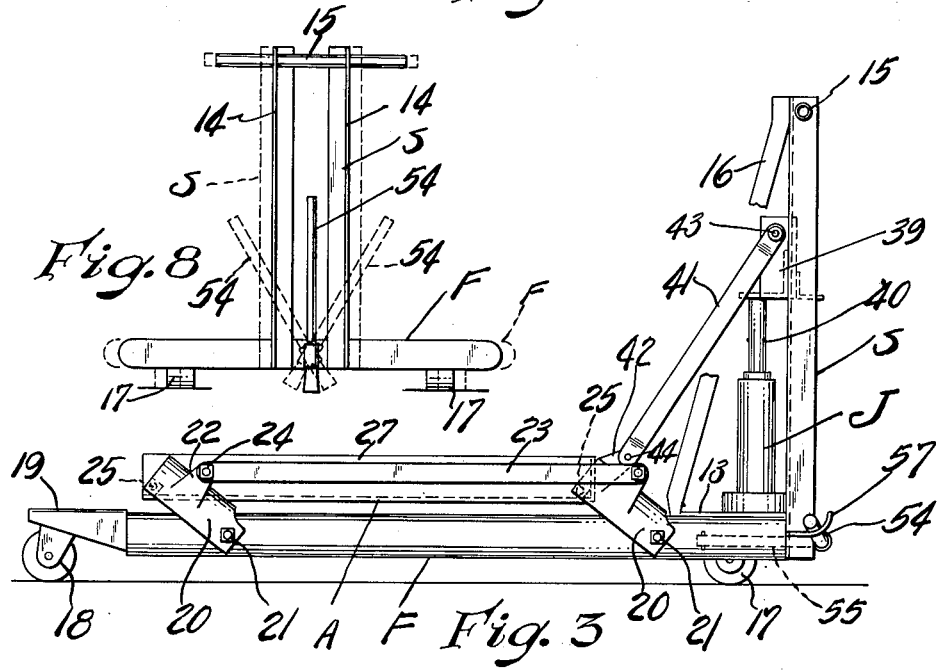
INVENTOR.
Sireno E. Huff.
BY Frank C. Karman
ATTORNEY Dec. 6, 1955          S. E. HUFF          2,725,998
TRUCK WHEEL DOLLIES
Filed Nov. 28, 1951          4 Sheets-Sheet 3
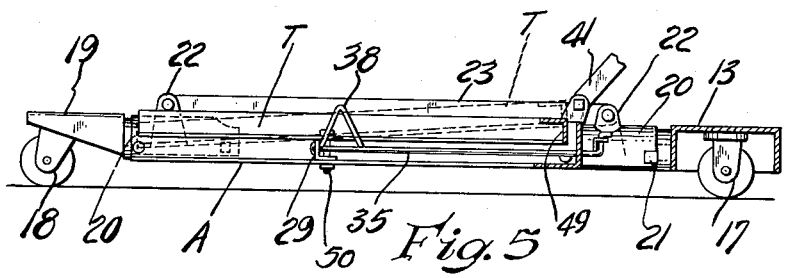
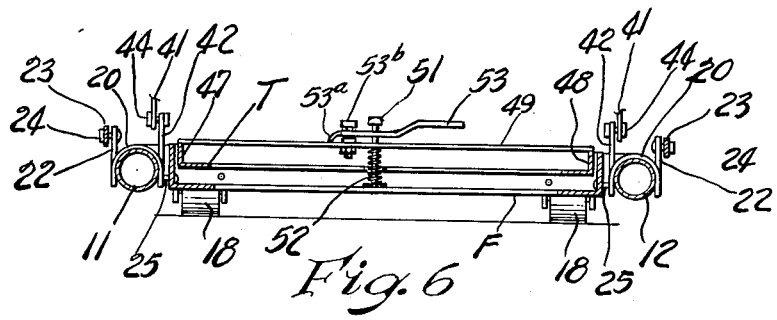
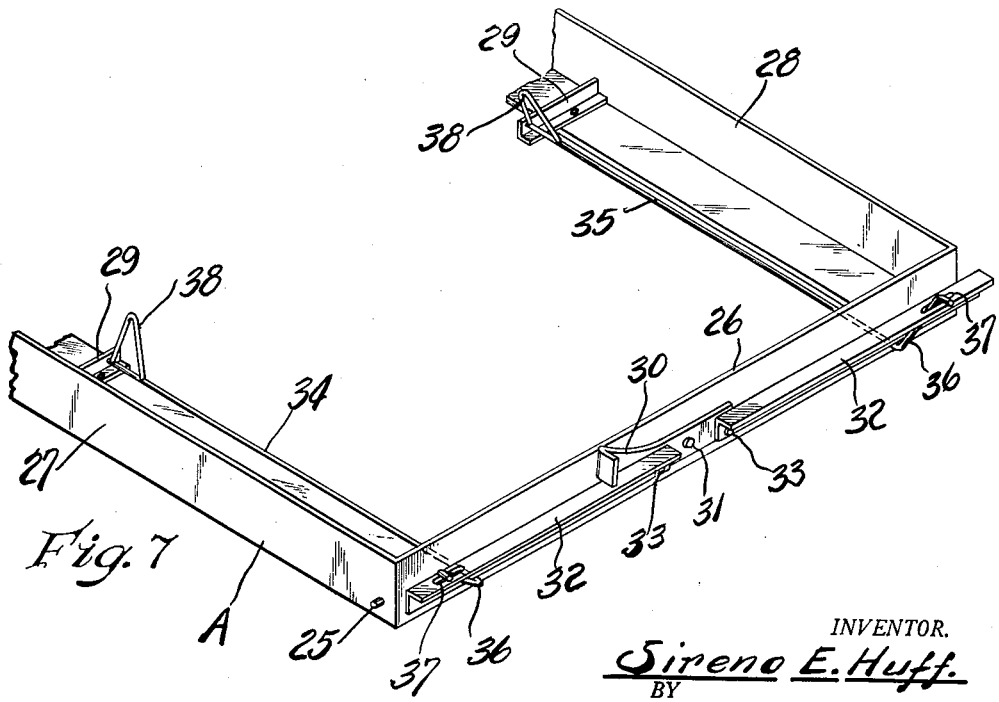
INVENTOR.
Sireno E. Huff
BY Frank C. Learman
ATTORNEY

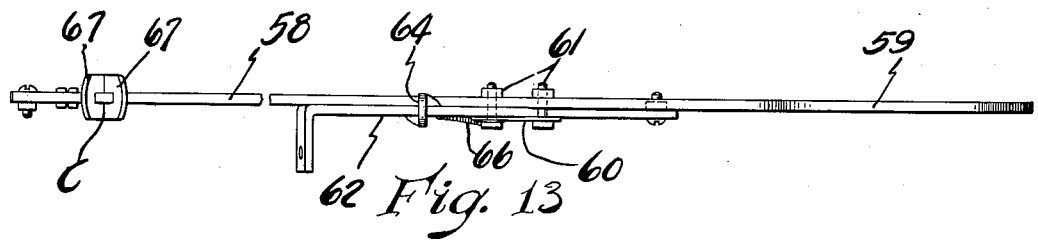
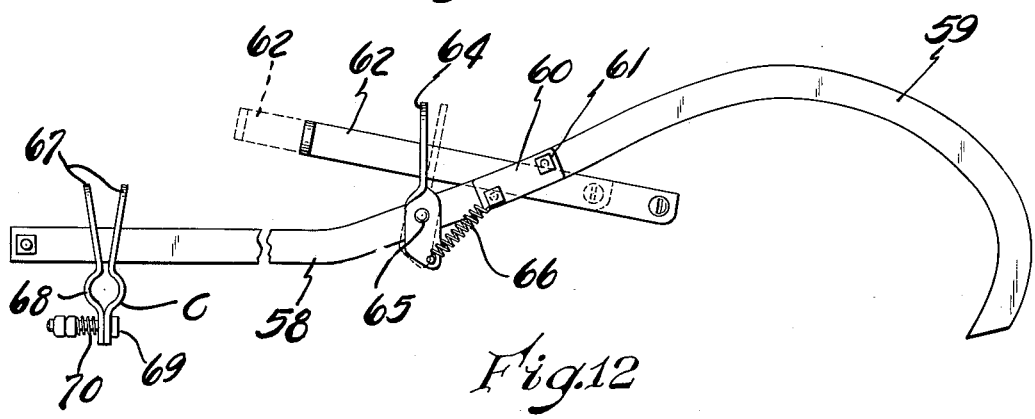
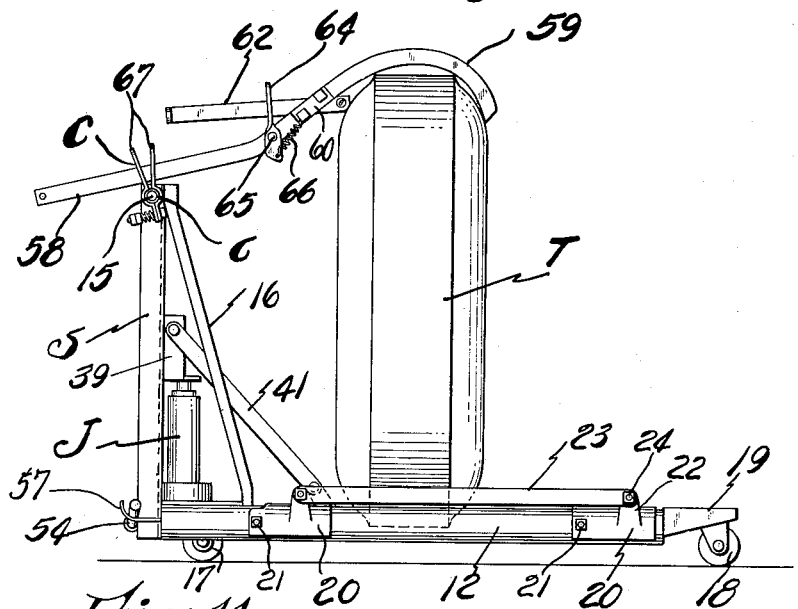

United States Patent Office 2,725,998
Patented Dec. 6, 1955

2,725,998

TRUCK WHEEL DOLLIES

Sireno E. Huff, Evart, Mich.

Application November 28, 1951, Serial No. 258,657

9 Claims. (Cl. 214—332)

This invention relates to portable truck wheel dollies of the type adjustable for use in lifting, transporting and balancing heavy truck wheels and tires with minimum effort as they are removed from or mounted on a vehicle axle.

One of the prime objects of the invention is to design a simple, practical and substantial, manually operable truck wheel dolly, including a vertically adjustable lift frame on which the tire rests and by means of which wheels with tires thereon can be transported, raised and/or lowered into proper alignment with the axle securing means to facilitate easy removal and replacement of said wheels and tires.

Another object is to provide a truck wheel dolly including a lift frame and a tiltable frame mounted thereon to balance and compensate for inequalities and differences in tire sizes, together with manually operable means for securing the wheel and tire against sliding movement on said frame.

A further object is to design a truck wheel dolly equipped with easily operable hydraulic means for raising the adjustable lift frame and the tire and wheel carried thereon to the desired position.

Still a further object is to provide a mobile wheeled frame provided with means for raising and/or shifting the rear end of the dolly transversely and/or horizontally to bring the vehicle wheel into desired alignment with the hub of the vehicle as well as assisting in the mounting of the wheel on the axle etc.

A further object still is to provide simple, practical and easily operable and adjustable means for holding a single wheel and tire in upright position on the dolly.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is a side elevational view of my truck wheel dolly showing the adjustable lift frame in lowered position, parts being broken away to more clearly show the construction.

Fig. 2 is a top plan view thereof, the broken lines illustrating the inching handle in extended position.

Fig. 3 is a view similar to Fig. 1 showing the lift frame in raised position.

Fig. 4 is a rear elevational view of the truck wheel dolly.

Fig. 5 is a longitudinal, sectional view taken on the line 5—5 of Fig. 2.

Fig. 6 is a transverse, sectional view taken on line 6—6 of Fig. 2.

Fig. 7 is a detail, perspective view of the lift frame.

Fig. 8 is a schematic, rear elevational view, the broken lines illustrating the transverse movement when the inching handle is attached.

Fig. 9 is a detail, rear elevational view of the lift frame showing the adjustable stop mechanism.

Fig. 10 is a view similar to Fig. 9 showing the mechanism swung up to lower the stop.

Fig. 11 is a view similar to Fig. 3 showing a single wheel and tire held in upright position on the dolly.

Fig. 12 is an enlarged, side elevational view of the tire showing the holding means.

Fig. 13 is a top plan view of the mechanism shown in Fig. 12.

Referring now more specifically to the accompanying drawings in which I have shown the preferred embodiment of my invention, the device comprises a substantially rectangular shaped frame generally designated at F and including oppositely disposed parallel side members 11 and 12 respectively, connected at their rear ends by means of a fabricated platform section 13 on which a vertically disposed standard S is welded or otherwise secured, said standard comprising spaced-apart angles 14, and a transversely disposed handle 15 spans said angles adjacent the upper ends thereof. Diagonally disposed braces 16 are connected to the upper end of the standard and to the platform 13 respectively for reinforcing and holding the angles 14 in proper position.

Castered wheel assemblies 17 are provided beneath the platform 13 (see Fig. 5 of the drawings) and similar assemblies 18 are provided on the brackets 19 which form an extension of the side members 11 and 12, so that the device may be readily wheeled from place to place and adjusted as desired.

Longitudinally spaced, semi-circular saddle members 20 are hingedly connected to the side members 11 and 12 by means of bolts 21 or the like, each saddle having an upstanding leg 22 struck therefrom, and horizontally disposed connecting bars 23 pivotally connect the legs 22 by means of bolts 24.

A U-shaped lift frame A is pivotally connected to the respective saddle members 20 by means of pins 25, said lift frame including rear and side members 26, 27 and 28 respectively, rigidly connected together by welding or the like, the pins 25 being connected to the saddle members 20 adjacent the front ends thereof so that the lift frame is raised when the saddle members are actuated, and transversely disposed angles 29 form a part of each side member and for a purpose to be presently described.

A suitable stop mechanism is mounted on the lift frame A and comprises a lever 30 pivotally connected to the rear member 26 by means of the pivot pin 31, and angle bars 32 are pivotally connected to the lever 30 at points equidistant from the pivot pin 31 by means of bolts 33.

Suitable openings (not shown) are provided in the rear member 26 of the lift frame, and the rear ends of the rod members 34 and 35 project therethrough beneath the bars 32, thence being bent upwardly as at 36 and extending through slotted openings 37 provided in the members 32. These rods 34 and 35 extend rearwardly as shown, the ends being journaled in suitable openings provided in the member 29, and triangular-shaped sections 38 are provided on each rod directly adjacent the front end thereof, and it will be obvious that as the lever 30 is manipulated, the triangular-shaped stop sections 38 can be swung to either horizontal or vertical position, these triangular-shaped sections, when in raised, vertical position, as shown in Figure 7, preventing shifting of the vehicle wheel (not shown) as it is being transported on the dolly.

A hydraulic jack member J is mounted on the rear platform 13 of the dolly, and includes a head 39 that slidably engages the angles 14 of the standard S, said head being connected to the piston rod 40 in any desired manner, and links 41 are pivotally connected to the head and the legs 42 provided on the rear saddle member 20 by means of bolts 43 and 44 respectively. A handle H is provided for manual operation of the jack, and a bracket 45 is provided for supporting the handle when not in use.

An upper tilt frame or evener T is mounted on the lift frame A and comprises rear and side angle frame members 47, 48 and 49 respectively, bolts 50 loosely connecting the side members 47 and 48 to the lift frame to permit limited vertical movement with relation thereto.

A bolt 51 extends through the member 49 with its lower end anchored to the frame A, and a coil spring 52 is interposed between the members 49 and the frame A. The upper end of bolt 51 projects above the member 49, and a bar 53 is bored to accommodate said bolt, one end of the bar being curved as at 53ª and said bar is loosely anchored to the bar 49 by a bolt 53ᵇ, the free end of the bar overhangs the member 49 and is loose on the bolt 51 so that the bar 53 can be raised to force the rear end of the tilt frame downwardly, and the bar will lock on the bolt, the spring 52 forcing the frame up when it is released, and this arrangement makes it possible to balance and adjust the frame T to different size tires of the dual.

An inching handle 54 is provided on the end of the machine to permit vibration of the dolly to break loose the wheel bearings (not shown) should they stick on the axle, and to shift the dolly transversely or longitudinally as desired. The handle 54 is mounted on a horizontally disposed pin 55 journaled on the lower face of the platform 13, the distance between the center of the pin 55 to the floor being slightly less than the distance from the center line of the pin 55 to the end of the inching bar, the ends of said bar being flatted as at 56, so that when the bar is swung to vertical position, the flatted end bears on the floor and the handle can then be swung as indicated in broken lines in Fig. 8 of the drawings, vibrating the dolly to break loose the wheel bearings (not shown), or for shifting the dolly transversely or longitudinally as desired. A bracket 57 is provided on the frame 13 to accommodate the handle when not in use.

When removing a dual wheel and tire from an axle the operation of the dolly is as follows:

The dolly is first moved into position with the free ends of the side members 11 and 12 straddling the wheel (not shown). The jack J is then actuated to swing the saddle members 20 about the pivot points 21 to raise the lift frame A, and the handle 30 is then swung down to swing the tire hooks to vertical position, preventing the wheel and tire sliding rearwardly on the dolly, and should the wheels stick on the axle, the assembly can be vibrated by action of the inching handle 54 as above described.

Upon release of the wheel, the operator grasps the handle 15 of the dolly and wheels it to desired location where the tire can be removed for repair, replacement, or for any other purpose.

After the wheel or tire has been repaired, it is again placed on the dolly and wheeled to proper location with relation to the vehicle axle. The jack J is then manipulated to raise the wheel into proper alignment with the axle (not shown) so that it can be mounted in position. Should the wheel be slightly out of alignment with the axle and require minute transverse or longitudinal adjustment, the operator manipulates the inching handle 54 to bring the wheel into proper alignment. The inching handle 54, when manipulated, provides for vibration and/or minute adjustment not possible by moving the dolly in the conventional manner.

When handling large single truck wheels and tires, I provide a simple, readily demountable and adjustable means for holding them in upright position on the dolly, said means including a horizontally disposed bar 58 slidably mounted in a self-locking clamp C releasably connected to the handle 15 of the dolly, the outer end of said bar being hook-shaped as at 59 to accommodate and hook over the wheel and tire T.

A flat plate 60 is secured to the bar 58 by means of bolts 61 and an adjustable leg 62 is slidably mounted therebetween, the one end extending through a slotted opening provided in a bracket 64 which is pivotally mounted on the bar 58 by means of a pin 65, the lower end of the bracket depending below the bar, and a spring 66 is connected to the end of the bracket and one of the bolts 61, thus providing tension on the lower end of the bracket and tending to lock the leg in adjusted position in the bracket, said leg being releasable by merely swinging the upper end of the bracket to release the clamping action.

The assembly is readily connectable to the dolly handle 15, the clamp C comprising a pair of identically similar diverging clamps 67—67, bowed as at 68 to fit the handle 15, the lower ends being connected together by means of a bolt 69 with a spring 70 interposed between the clamp members and the head of the bolt, slotted openings being provided in the upper ends of the clamps and through which the bar extends. These clamps 67—67 are normally disposed at an angle with relation to each other so that the bar 58 binds in the opening 71 and provides a clamping action on the bar, and when the operator forces the upper ends of the clamps 67—67 towards each other, the bar will be released and can be freely slidable therein so that it may be longitudinally adjusted to engage and hook over the tire, after which the leg 62 is adjusted against the opposite edge of the tire, and the dolly with the tire thereon, in upright position, can be moved where desired.

For example, when the clamp C is mounted on the handle 15 with the bar 58 inserted through the openings 71, and the hook-shaped end 59 is placed over the tire T, the operator then adjusts bar 58 to hold the tire in vertical position, the bracket 64 is then swung to release the leg 62 which is then adjusted outwardly to bring its one end into engagement with the opposite sidewall of the tire T, thereby holding it in upright position so that it can be transported to any desired location.

From the foregoing description, it will be obvious that I have perfected a very simple, practical and relatively inexpensive dolly which can be hydraulically operated for raising and lowering large tire casings and wheels, either single or dual, when mounting or removing the same, and for transporting them from one location to another.

What I claim is:

1. A dolly comprising a mobile, U-shaped frame formed with cylindrical parallel side members, and a rear end member a vertically disposed standard mounted centrally on the end member, longitudinally spaced pairs of elongated saddle members of arcuate cross section mounted on and pivotally connected at their rear ends to each side member, tangentially and laterally projecting legs on said saddle members, a connecting bar connecting the legs of each pair of saddle members, a lift frame interposed between and pivotally connected to the front ends of the saddle members, a jack on the end member, a head associated therewith and slidable vertically on said standard, and linear links connecting the front ends of the rear saddles with said head for swinging said saddles about their pivot points to raise said lift frame when the jack is actuated.

2. The combination defined in claim 1 in which a separate tilt frame is rockably mounted on said lift frame to tilt with respect thereto, and means on said lift frame for locking said tilt frame in adjusted positions.

3. A dolly comprising a portable, wheel supported, U-shaped frame formed with tubular side and end frame members, longitudinally spaced elongated saddles pivotally mounted at one end on the tubular side members and formed with upwardly projecting legs, connecting rods connecting said legs, a lift frame pivotally connected to the free ends of said saddle, a standard on the end frame member, a jack means including a head slidable thereon, linkage connecting the head at said legs with said jack means, a separate tilt frame on said lift frame and means for depressing the rear end of said tilt frame and releasably locking said frame in tilted position.

4. A dolly comprising a portable, wheel supported, open, horizontal frame formed with tubular side members connected by a rear end member, elongated, longitudinally spaced saddles of arcuate cross section mounted on and pivotally connected at one end to the side members, the saddle being formed with tangentially disposed, upwardly projecting legs, connecting rods pivotally connecting said legs, a lift frame mounted on the wheel supported frame and having pivotal connection with the front ends of said saddles, a platform on the rear end of the open frame and including a vertically disposed standard, a manually actuated jack, a head connected thereto and slidably engageable with said standard, and a pair of linear links connecting the rear saddles and head respectively for actuating said lift frame when the jack is actuated.

5. The combination set forth in claim 4 in which a transversely disposed handle is provided on the upper end of the standard, detachable clamp means on said handle, a longitudinally extending hook-shaped tire engaging member adjustably mounted in said clamp and engageable with the front face of a tire, an arm pivotally mounted interjacent the ends of said hook-shaped member for engaging the opposite face of said tire, and means on said hook-shaped member for locking said arm in position to clamp said tire and hold it in upright position.

6. A dolly comprising a mobile U-shaped frame formed with parallel side members and a rear end member, lever members pivotally connected at their rear ends to each side member, a lift frame interposed between and connected to the front ends of the lever members, jack means supported on the rear end member, linkage connecting said jack means and the lever members for swinging said members vertically to raise or lower said lift frame when the jack means is actuated in a corresponding direction, a separate tilt frame rockably mounted on said lift frame interjacent its ends to tilt with respect thereto, and means on the rear end of said lift frame for locking the rear end of said tilt frame in depressed positions.

7. The combination defined in claim 6 in which said locking means comprises a lever pivotally mounted at one end on said tilt frame, a post on said lift frame extending through said tilt frame, an opening provided in said lever a spaced distance from the end thereof, and spring means on said post between said lift frame and tilt frame to normally urge said tilt frame to level position.

8. The combination defined in claim 6 in which a handle is pivotally mounted on the rear end of said lift frame to swing in a transverse plane, a pair of links extending substantially transversely therefrom in opposite directions on opposite sides of said pivot point, longitudinally disposed stop rods with offset projections on the front end thereof, pivotally mounted on said lift frame with the rear ends connected to the free ends of said links, said projections extending laterally when said handle is vertically disposed and being pivoted to vertical position to restrain longitudinal shifting of a tire on said dolly when said handle is horizontally disposed.

9. The subject matter set forth in claim 6 in which inching mechanism comprising a centrally disposed, horizontal rod slidably mounted on the end frame and adjustable outwardly therefrom is provided, and an actuating lever mounted to swing in a transverse plane is pivotally secured to said rod, the length of said lever, from the pivotal connection on the rod to the floor line, being slightly greater than the distance from the horizontal rod to the floor.

References Cited in the file of this patent
UNITED STATES PATENTS

| | | |
|---|---|---|
| 914,938 | Fleming | Mar. 9, 1909 |
| 1,241,366 | Forney | Sept. 25, 1917 |
| 1,360,412 | Kirchner | Nov. 30, 1920 |
| 1,743,542 | Groenke | Jan. 14, 1930 |
| 2,003,361 | Harless | June 4, 1935 |
| 2,379,587 | Moore | July 3, 1945 |
| 2,410,902 | Roberts | Nov. 12, 1946 |